H. W. WARNER.
MANUFACTURE OF AXES.
No. 184,311. Patented Nov. 14, 1876.
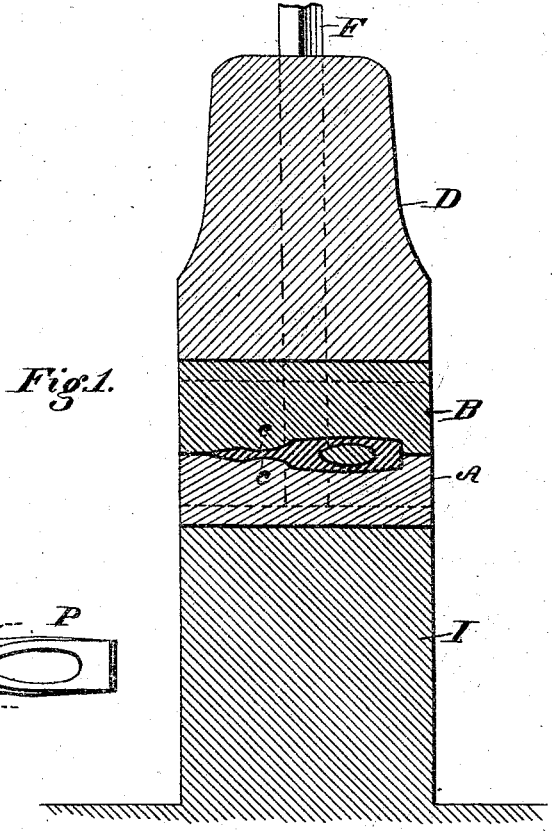
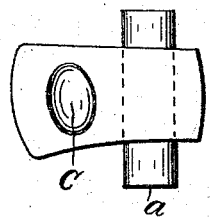
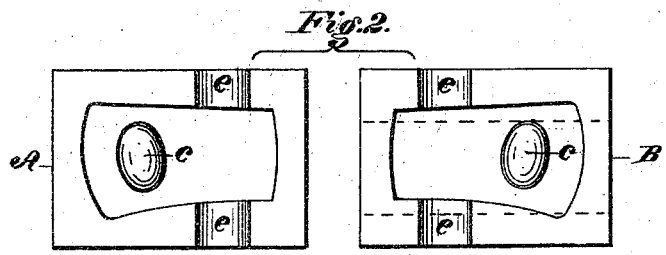
Witnesses:
Donn J. Twitchell,
W. E. Chaffee.
Inventor:
H. W. Warner,
by Dodge & Son,
Attys.

UNITED STATES PATENT OFFICE.

HENRY W. WARNER, OF GREENFIELD, MASSACHUSETTS.

IMPROVEMENT IN THE MANUFACTURE OF AXES.

Specification forming part of Letters Patent No. 184,311, dated November 14, 1876; application filed September 19, 1876.

*To all whom it may concern:*

Be it known that I, HENRY W. WARNER, of Greenfield, in the county of Franklin and State of Massachusetts, have invented certain Improvements in Dies and Process for Making Axes, of which the following is a specification:

My invention consists in the peculiar construction of dies used for making the ax patented to me on the 15th of August, 1876, No. 181,227, and in an improvement in the process of welding the bit to the poll, all as hereinafter more fully described.

Figure 1 is a vertical section of a drop-press, showing the dies with the ax in position, as it is when the stroke is completed. Fig. 2 is a face view of the two dies detached. Fig. 3 represents the poll and bit prepared for welding, and Fig. 4 represents the ax as it is when removed from the dies after the welding has been effected.

The object of this invention is to make an ax with concave depressions in the sides a short distance from the cutting-edge, and to accomplish the welding of the bit to the poll by a single blow in a drop-press, and at the same time and by the same operation by which the cavities are formed. To accomplish these objects I make two dies, A and B, having in their faces cavities corresponding in form and size with the ax when completed. In each of these cavities I make an oval projection, $c$, as represented in Fig. 2, these projections being properly located, and of the requisite size to form the depressions C in the sides of the ax, as shown in Fig. 3. The dies are also provided with lateral grooves or depressions $e$ of the proper size to receive the mandrel or plug $a$, which is fitted into the eye of the ax before it is placed in the press, and which remains in the eye during the operation of dropping or welding the parts, the object of this plug or mandrel being to preserve the form and size of the eye while the ax is being operated upon. It also assists to hold the poll in its proper position in the die. The dies, being thus prepared, are secured in a drop-press of suitable construction, as shown in Fig. 1, one being fastened to the bed or anvil I, and the other to the hammer or drop D. The poll P and the steel blank $b$ for the bit are then prepared by a method well known to the trade, and are left in the form shown in Fig. 3. These are then heated, and the blank $b$ has its thinner or beveled edge inserted in the notch or split in the front of the poll, and both together are then placed in the lower die A, when the drop D, with the upper die B, is allowed to fall thereon.

It will be observed that the apex of the projections $c$ in the dies are so located or arranged that they will first begin to compress the metal just at the point where the inner edge of the blank $b$ touches the iron at the bottom of the notch in the poll P, and, consequently, the weld will first begin at that point, and extend from thence outward toward the edge of the ax. This is important, for the reason that, unless the metals are first united at that point, it is difficult, if not impossible, to form a perfect weld. As the dies are brought together, the projections $c$, at the same time that they commence to form the weld, also commence to crowd the overlapping edges of the iron of the poll downward over the sides of the blank $b$, thus spreading or drawing the overlapping iron on each side farther down toward the edge of the blade, thereby extending the iron downward as far as is necessary to support the steel and form a perfect weld, thus imitating, in this respect, the operation as ordinarily conducted by hand or trip hammers. At the same time, and by the same blow that performs these operations, the blank $b$ is pressed out so as to fill that part of the dies, and thus give to the blade the required form and size. When this has been done, the ax is removed from the dies, and will then be in the condition shown in Fig. 4—that is to say, the ax is completed, so far as the welding and forging, including the drawing or shaping of the blade and the forming of the cavities in its sides are concerned; and all this, it will be observed, is done by a single blow of the drop.

While, at first sight, it would appear that the entire operation is instantaneous, or nearly so, yet, upon analyzing the operation, it will be seen that the several operations of welding, forming the cavities, and shaping the blade proceed in a regular and progressive manner, and that the operation commences at the upper edge of the weld, and extends from thence downward toward the edge of the blade, where it is completed.

After the ax is removed from the dies it is only necessary to knock out the mandrel or plug *a*, after which it is ground, tempered, and polished in the usual manner.

By this method a very great saving of time and labor is effected, as also of fuel, as I accomplish by a single heat what by the usual methods requires several heats.

I am aware that it has been proposed to weld and shape axes in dies by using two or more sets of dies, and requiring a corresponding number of separate operations; but I am not aware that they have ever before been completed by means of a single pair of dies, or by a single operation. Neither am I aware that dies having projections like mine have ever before been made or used for this purpose.

Having thus described my invention, what I claim is—

1. The dies A and B, provided with the projections *c*, for welding and shaping axes, substantially as set forth.

2. As an improvement in the process of making axes, the herein-described method of welding and shaping the same at one operation by means of dies, constructed and operating substantially as described.

HENRY W. WARNER.

Witnesses:
J. H. SANDERSON,
C. R. WHEAT.